United States Patent Office 3,473,023
Patented Oct. 14, 1969

3,473,023
PROCESS FOR A LINEAR ANALYSIS OF SURFACES OF STRUCTURALLY HETEROGENEOUS METALLIC OR NON-METALLIC SUBSTANCES
Rupert Blöch, Kernstockgasse 41, Kapfenberg, Styria, Austria
Filed Feb. 1, 1967, Ser. No. 614,388
Int. Cl. H01j 37/26
U.S. Cl. 250—49.5      2 Claims

ABSTRACT OF THE DISCLOSURE

The subject matter of the invention relates to a method for carrying out a linear analysis of surfaces of structurally heterogeneous metallic or non-metallic substances with the aid of a micro-analyzer, whereby the to be analyzed surface is scanned with an electron beam along a straight line with a known uniform velocity. Electric voltages, which are generated with the aid of analyzing means of the micro-analyzer, may be used by any characteristic property of the phase of the substance which is being investigated. A voltage range is selected by at least a first discriminator and is instrumental in opening a switching circuit, said voltage range being particularly characteristic for the phase which is being aialyzed. An oscillator, of known constant frequency, is connected in parallel with an electronic switching member and delivers pulses, which are conducted by said electronic switching member as long as the electron beam is positioned over the to be measured phase. At least one additional branch circuit is connected in parallel. This branch circuit includes a second discriminator having the same voltage range threshold as said first discriminator, and when receiving voltages of the same control magnitude, opens a second switching circuit, whereby a second electronic switching member passes pulses, emitted from a variable frequency pulse generator, which preferably is an X-ray spectrometer, as long as the electron beam is positioned over the to be measured phase. The total number of these pulses being counted by an additional counting member.

---

This invention relates to a method of linear analysis on surfaces of structurally heterogeneous, metallic or nonmetallic substances with the aid of an eletcron beam micro-analyzer which scans the area to be analyzed along a straight line while the scanning apparatus moves at a uniform rate of speed. Voltages are generated by the analyzer means of the electron beam micro-analyzer, which are derived from any desired property of the phase to be investigated, and by means of a discriminator a voltage range is selected from among said generated voltages which is particularly characteristic of the phase to be analyzed. The selected voltage range is instrumental in opening a gate. An oscillator, which operates under a constant frequency, is connected in parallel to said gate. This oscillator is connected to an electronic switch which transmits pulses from said oscillator as long as the electron beam is on the phase to be measured. The ratio of the number of pulses transmitted, which are counted with a counting mechanism, to the total number of pulses which would be generated during analysis with a continuously open gate, indicates the proportion (concentration) of the phase to be measured.

In the event the scanning by electron beam is controlled by means of a scanning arrangement known per se, the process may be adapted in a simple manner for analyzing a plane surface.

For the analysis of the phase there may be used, for example, the counting-rate meter voltage or the absorbed or diffusely reflected electron stream.

The process of this invention is carried out by having the area to be analyzed by an electron beam of a microanalyzer scanned along a straight line of known length with a uniform and known velocity. The voltage V, which is analogous to the counting rates, is generated at the counting-rate meter where it is picked up and conducted to a switching circuit. Thus, the voltage, which varies along the to be scanned surface, must pass through a discriminator, which permits the selecting of a voltage between two preselected limits by means of an upper and lower threshold. The voltage range is selected so that it is characteristic for the to be analyzed phase. Thus, the arrangement is such that the discriminator only then produces an output voltage when the counting-rate meter has scanned a voltage that falls within the preselected range. Those voltages falling about or below the range are being suppressed. Consequently, these voltages occur only when the electron beam impinges on a phase which gives a response within the selected voltage range and they are then utilized for controlling, for example, a switching transistor. An oscillator is connected in parallel to said transistor to apply to the same a voltage pulse train at a known, constant repetition rate. The pulses from this oscillator, which, for example, may amount to 50 pulses per second, will be passed by the transistor only when the selected voltage range is applied. In this gate, the X-ray pulses emitted by the sample are utilized only for control. On the other hand, the number of pulses which is used in the result of measurement is constant per unit of time. The number of these pulses are registered by a counter, which is suitably combined with a printer. For an evaluation of the result of the measurement, the total number of pulses transmitted during analysis may be used and may be compared with the known possible number of pulses, which would have been obtained during the analysis if the gate had been permanently opened during the scanning process. Thus, the concentration of the phase to be measured can be determined.

If there are two or more counting mechanisms available in the micro-analyzer, in order to determine two or more elements simultaneously, it is possible to increase still further the precision of the analysis of the process, because in such a case two or more of the elements, which are present in the to be analyzed phase, may be selected as conductor elements.

In order to effectuate an analysis with such an arrangement, a coincidence circuit must be joined to the switching circuit. This coincidence circuit only transfers a voltage or locks the switching circuit, when there are simultaneously present in two parallel or more voltage lines, voltages that fall within preselected limits. It is thus possible to utilize the properties, which manifest themselves when the characteristic voltages of a phase are generated, in order to open or close a switching circuit. The latter conducts the pulses, which are delivered by an oscillator that operates with constant frequency, as long as the electron beam is situated on the to be measured phase. Since the pulse frequency is constant it is possible to refer back the total number of measured pulses to the total time during which the switching circuit was open, and due to the fact that the scanning velocity is known, to the linear, respectively surface portion of that phase, the selected characteristic property of which, produced by the resulting voltages, causes the opening and closing of the switching circuit via a discriminator. The process is therefore best suited for the surface analyses of different phases.

The process of this invention is based on the concept that when the total time is known, during which the switching circuit is open, pulses of variable frequency may also be added during this time period. For example, the X-ray pulses emitted by a spectrometer may be counted so that the average number of pulses per N second are determined.

The novel features which are considered characteristic for the invention are set forth in particular in the appended claims. The invention itself, however, both as to its construction and its method of operation, together with additional object and advantages thereof, will be best understood from the following description when read in connection with the accompanying drawing in which:

Figure 1:
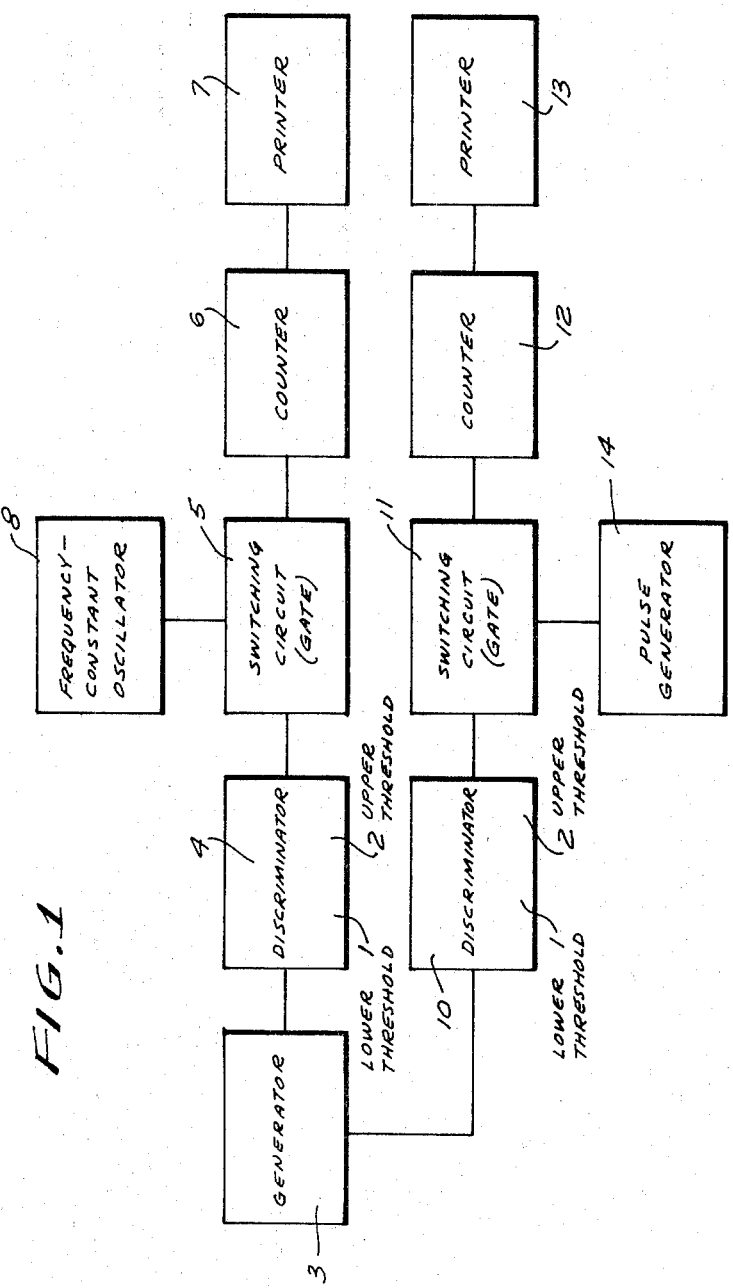
FIG. 1 is a block circuit diagram of a micro-analyzer for carrying out the method of this invention.

There is illustrated in FIG. 1 an arrangement for carrying out such a measurement. This arrangement comprises the above described combination of the voltage generator 3, a discriminator 4, having a lower threshold 1 and an upper threshold 2, a switching circuit (gate) 5, with a frequency-constant oscillator 8 connected in parallel to the gate 5, a counter 6 and a printer 7. This arrangement is complemented by a second branch in parallel with the aforedescribed first branch comprising units 4, 5, 6 and 7 which is also connected to the voltage generator 3. This second branch includes discriminator 10, which has the same thresholds 1 and 2 as the discriminator 4, a switching circuit (gate) 11, a counter 12 and a printer 13. However, in the switching circuit 11 there is connected in parallel a pulse generator 14, instead of the frequency-constant oscillator 8, which emits pulses of variable frequency which are counted by the counter 12 and printed by the printer 13. This arrangement is particularly suitable for the X-ray pulses that are delivered to a spectrometer. The operation of the branch comprising elements 3, 4, 5, 6, 7 and 8 is equivalent to that of a similar arrangement described in our co-pending application Ser. No. 563,191, filed July 6, 1966, and delivers the total sum of pulses N which pass the gate 5 in an analogous manner. From this and from thet pulse frequency V of the oscillator 8 the total time during which the gate 5 remained open, can be calculated as follows: $T_1 = N_1/V$. In the event the discriminator 10 is adjusted to the same threshold values 1 and 2 as the discriminator 4 and both discriminators are connected to the voltage generator 3, which generates voltages having a control magnitude which is characteristic for a determined phase, the time period during which the gate 11 remains open, will also amount to T. During this time period the variable pulses, which are delivered by the pulse generator 14, pass through the gate 11 and are added by the counter 12. Their total amounts to $N_2$. The average number of pulses per N second is calculated as follows: $N_2/T_1$.

When the scanning of the sample surface is executed with the aid of a scanning apparatus, the arrangement of this invention may also be used for analyzing a surface.

If now the arrangement is to be used in a completely defined phase, for example, the total amounts of certain alloying elements that are present in inclusions, it is only necessary to adjust the spectrometer to a characteristic wave length of the to be analyzed element, and to compare the obtained average X-ray pulse number per N second with a corresponding pulse number $N_0$ of a standard of known composition.

For example, a ferro-chrominum alloy, having strongly heterogeneous oxydic inclusions, was examined to ascertain its average composition with the aid of the process of this invention. A qualitative orientation measurement indicated as the main component elements Cr, Si as well as some Mn.

The absorbed electron stream was utilized as having a characteristic magnitude for the inclusions, because the inclusions, due to their high oxygen content, have a significantly lower average concentration factor as the surrounding metallic Cr-Fe matrix. Due to this factor, the absorbed electron beam when traversing from an inclusion to the matrix rises substantially.

In such a case only the lower threshold 1 of the discriminators 4 and 10 (FIG. 1) are utilized, that is they are adjusted in such a way that the gates 5 and 11 only open then when the absorbed electron stream has reached a magnitude that is characteristic and thereby assures that the point of impingement of the electron beam is located at one of the to be investigated inclusions.

First the spectrometer is adjusted to the CrKα line and the number pulses per $N_0$ second are determined for a pure Cr standard composition, $N_0 = 1039$.

Thereafter a pre-selected test area is scanned, line after line, with a scanning apparatus.

From this probe a total pulse number $N_1 = 4339$ was obtained, which corresponds, at a pulse frequency of 50 Hz of the oscillator S, to an effective measuring period $T_1 = 4339/50 = 86.8$ seconds. From this average pulse number for the CrKα-radiation on to the inclusion can be calculated by $N = 34242/86.8 = 395$ and the measured concentration by comparison to the standard $$C = \frac{395}{1039} \cdot 100\% = 38\% \text{ Cr}$$

The concentration of 12% Si 4% Mn can be calculated in an analogous manner. Then the obtained results are converted to oxide concentrations and by using the "Tong-Philibert" correction factor one obtains the average concentration analysis of: 38% $Cr_2O_3$, 34% $SiO_2$ and 7% MnO.

Heretofore, measurements such as outlined above, could only be effectuated by highly complicated methods, for example, an analysis of the slag residue. The method of this invention makes it possible, however, to obtain indications about the surfaces of certain metallic phases or the distribution of certain chemical elements within a predetermined phase along a straight path, respectively within a scanning region. The advantage of the novel method of this invention resides in its simplicity and the resulting time saving and, furthermore, the heretofore unattained accuracy of the measurements.

In the even there are present a sufficient number of surfaces to be measured, it is possible with the method of this invention to increase even further the accuracy of the analysis, in a manner analogous to that disclosed in our U.S. patent application Ser. No. 563,191, filed on July 6, 1966, by using two or more elements contained in the phase to be analyzed as indicating elements.

Figure 3B:
FIG. 3B is a diagram illustrating the number of emitted pulses per unit of time after they have been converted to rectangular pulses.
Figure 3A:
FIG. 3A is a diagram illustrating the number of emitted pulses per unit of time as they exit from the coincidence circuit.
Figure 2:
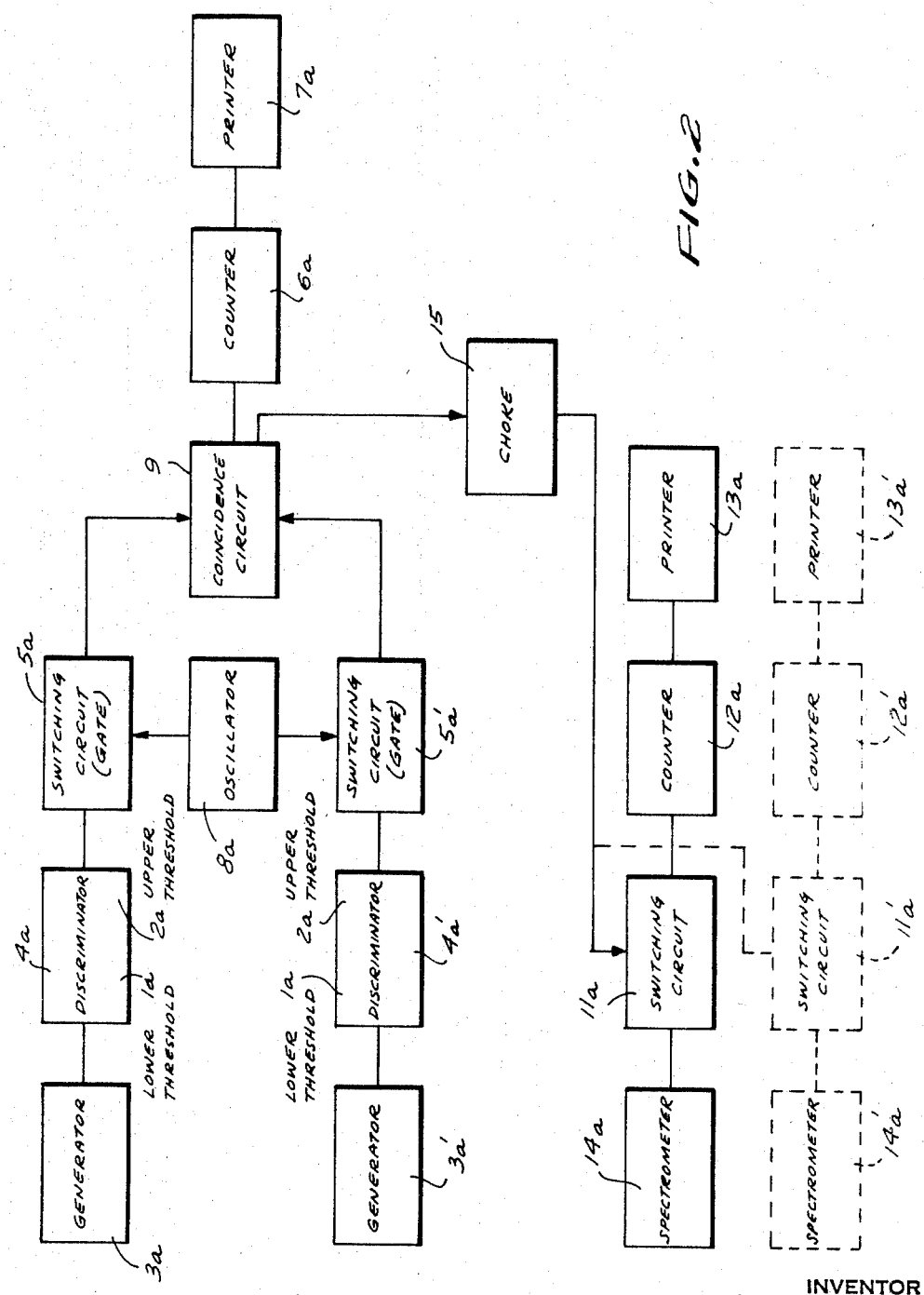
FIG. 2 is a block circuit diagram representing the branch for the X-ray pulse measurements of the micro-analyzer arrangement of FIG. 1.

FIG. 2 is a block diagram representing the branch for the X-ray pulse measurement of the arrangement, wherein there is a coincidence circuit 9 arranged, which transmits pulses only to the switching circuit when there are simultaneously present, in two (or more) parallel voltage generator branches 3 and 3', voltages within preselected limits (thresholds 1 and 2 at the discriminators 4 and 4'). A smoothing limiter choke member 15 is connected between the gate circuit 9 and the switching circuit 11, whereby simultaneously the frequency of the oscillator 8 is advantageously increased a few kHz. The limiter 15 effectuates a conversion of the pulse groups which exit from the coincidence circuit as illustrated in FIG. 3B so that they become rectangular pulses (see FIG. 3A) which have a length that corresponds to the length of the pulse trains. In selecting the time constant for the limiter it is significant that the time constant is, on the one hand, smaller than that of the voltage generators 3 and 3' (that is most of the time <100 msec.) and, on the other hand, simultaneously larger than that of the pulse sequence period at the output of the coincidence circuit 9 (that is >1 msec.). In our special case the time constant of the limiter 15 was set at 10 to 20 msec. The signals which are received at the output of the limiter, effectuate a closing of the switching circuit 11, whereby the X-ray pulses (see FIG. 3B) which emanate from the spectrometer 14, are conducted to the counter 12 and the printer 13. It will become evident to those skilled in the art that when there are a sufficient number of surfaces to be measured, several circuit branches may be used in an analogous manner, one of said branches being indicated by dotted lines in FIG. 2.

In the foregoing, the invention has been described in connection with several preferred arrangements thereof. Since many other variations and modifications will now become obvious to those skilled in the art, it is desired that the breadth of the claims not be limited to the specific disclosure therein contained.

What is claimed is:

1. A method of linear analysis of surfaces of structurally homogeneous metallic or non-metallic substances with the aid of an electron beam micro-analyzer, comprising the steps of:

scanning the area to be analyzed along a straight line at a known uniform velocity with an electron beam whereby voltages are generated which are derived from any given property of the phase of the substance which is being investigated with the aid of an analyzing arrangement of the micro-analyzer;

selecting a voltage range by means of at least one discriminator, said selected voltage range being particularly characteristic of the phase which is being investigated;

opening a gate by means of the selected voltage range;

connecting a constant-frequency oscillator in parallel to the gate via an electronic switching element whereby the latter permits the passage of pulses from the oscillator as long as the electron beam impinges on the phase to be analyzed, the duration during which the electron beam impinges on the phase being the quotient of the total number of constant-frequency pulses passed by the gate and the constant frequency of the oscillator;

opening at least one additional gate by means of voltages of the same control magnitude via a second discriminator operating under the same selected voltage range; and connecting an X-ray spectrometer in parallel with the additional gate via an additional electronic switching element whereby the latter permits the passage of variable frequency pulses from the X-ray spectrometer, which is arranged to pick up radiation from the surface as long as the electron beam impinges on the phase to be analyzed, the quotient of the total number of variable frequency pulses passed by the additional gate and the above-mentioned duration determining the average number of variable frequency pulses per second emanating from the spectrometer.

2. A method as defined in claim 1, further comprising the steps of adjusting the spectrometer to a characteristic wave length of the phase to be analyzed and comparing the average number of variable frequency pulses per second with a corresponding number of pulses from a standard of known composition.

References Cited
UNITED STATES PATENTS 3,193,679 7/1965 Melford et al.
3,260,845 7/1966 Duncumb.

RALPH G. NILSON, Primary Examiner

A. L. BIRCH, Assistant Examiner

U.S. Cl. X.R.

250—51.5